United States Patent
Burr et al.

(10) Patent No.: US 8,506,808 B2
(45) Date of Patent: Aug. 13, 2013

(54) TUBESHEET AND METHOD FOR MAKING AND USING THE SAME

(75) Inventors: Scott T. Burr, Midland, MI (US); Peter E. M. Aerts, Hulst (NL); Gavin D. Vogel, Warren, MI (US); David J. Moll, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 403 days.

(21) Appl. No.: 12/891,968

(22) Filed: Sep. 28, 2010

(65) Prior Publication Data

US 2012/0074054 A1    Mar. 29, 2012

(51) Int. Cl.
*B01D 63/04*    (2006.01)
*B01D 63/06*    (2006.01)
*B01D 69/08*    (2006.01)

(52) U.S. Cl.
USPC .............. 210/321.89; 210/323.2; 210/321.61; 210/500.23; 210/321.88; 96/8

(58) Field of Classification Search
USPC ............. 210/500.23, 321.78, 321.79, 321.8, 210/321.81, 321.87, 321.88, 321.89, 321.9, 210/321.61, 323.2, 503, 504, 508, 321.69, 210/500.21; 96/8, 10
See application file for complete search history.

(56) References Cited

U.S. PATENT DOCUMENTS

| | | | |
|---|---|---|---|
| 3,708,071 A | 1/1973 | Crowley | |
| 3,722,695 A | 3/1973 | Sargent et al. | |
| 4,049,765 A * | 9/1977 | Yamazaki | 264/261 |
| 4,138,460 A | 2/1979 | Tigner | |
| 4,289,623 A * | 9/1981 | Lee | 210/247 |
| 4,389,363 A * | 6/1983 | Molthop | 264/135 |
| 4,565,630 A * | 1/1986 | Runkle | 210/321.89 |
| 4,689,191 A | 8/1987 | Beck et al. | |
| 5,139,191 A * | 8/1992 | Velterop | 228/124.1 |
| 5,192,478 A | 3/1993 | Caskey | |
| 5,837,234 A * | 11/1998 | Gentile et al. | 424/93.7 |
| 5,840,230 A | 11/1998 | Geleff et al. | |
| 6,214,226 B1 | 4/2001 | Kobayashi et al. | |
| 6,290,756 B1 | 9/2001 | Macheras et al. | |
| 6,294,039 B1 | 9/2001 | Mahendran et al. | |
| 6,592,759 B2 | 7/2003 | Rabie et al. | |
| 6,716,275 B1 * | 4/2004 | Reed et al. | 96/10 |
| 6,974,554 B2 | 12/2005 | Cox et al. | |

(Continued)

FOREIGN PATENT DOCUMENTS

EP    0920904    6/1999
JP    59-004403    1/1984

(Continued)

*Primary Examiner* — David C Mellon
(74) *Attorney, Agent, or Firm* — Edward W. Black

(57) ABSTRACT

A tubesheet, modules incorporating tubesheets and methods for making and using the same. In one embodiment the invention includes a tubesheet comprising: i) a plurality of aligned semi-permeable hollow fiber membranes each comprising a cylindrical porous structure surrounding a lumen and extending between a first and second end and further comprising a first segment located adjacent the first end and a second segment located adjacent to the second end and ii) a block of potting material including an interfacial surface. The first segment of the hollow fiber membrane is embedded within the block of potting material and the second segment extends from the interfacial surface of the block. The tubesheet further comprises a penetrating extension of potting material within the porous structure of the second segment of the hollow fiber membrane that extends along a length from the interfacial surface of the block to a distal end.

9 Claims, 3 Drawing Sheets

(56) References Cited

U.S. PATENT DOCUMENTS

| | | |
|---|---|---|
| 7,160,454 B2 | 1/2007 | Vossenkaul et al. |
| 7,344,645 B2 | 3/2008 | Beck et al. |
| 7,393,486 B2 | 7/2008 | Szabo et al. |
| 7,662,333 B2 | 2/2010 | Coan et al. |
| 7,704,393 B2 | 4/2010 | Noh et al. |
| 2001/0037967 A1* | 11/2001 | Rabie et al. ............... 210/321.8 |
| 2005/0126982 A1 | 6/2005 | Stachera et al. |
| 2005/0145556 A1* | 7/2005 | Beck et al. ............... 210/321.65 |
| 2006/0191838 A1* | 8/2006 | Lowell ............... 210/321.61 |
| 2007/0158257 A1 | 7/2007 | Schafer et al. |
| 2009/0026140 A1 | 1/2009 | Wu et al. |
| 2011/0031180 A1 | 2/2011 | Tada et al. |

FOREIGN PATENT DOCUMENTS

| | | |
|---|---|---|
| JP | 63111906 | 5/1988 |
| JP | 07-32867 | 4/1995 |
| JP | 2005-052716 | 3/2005 |
| JP | 2009-125642 | 6/2009 |

* cited by examiner

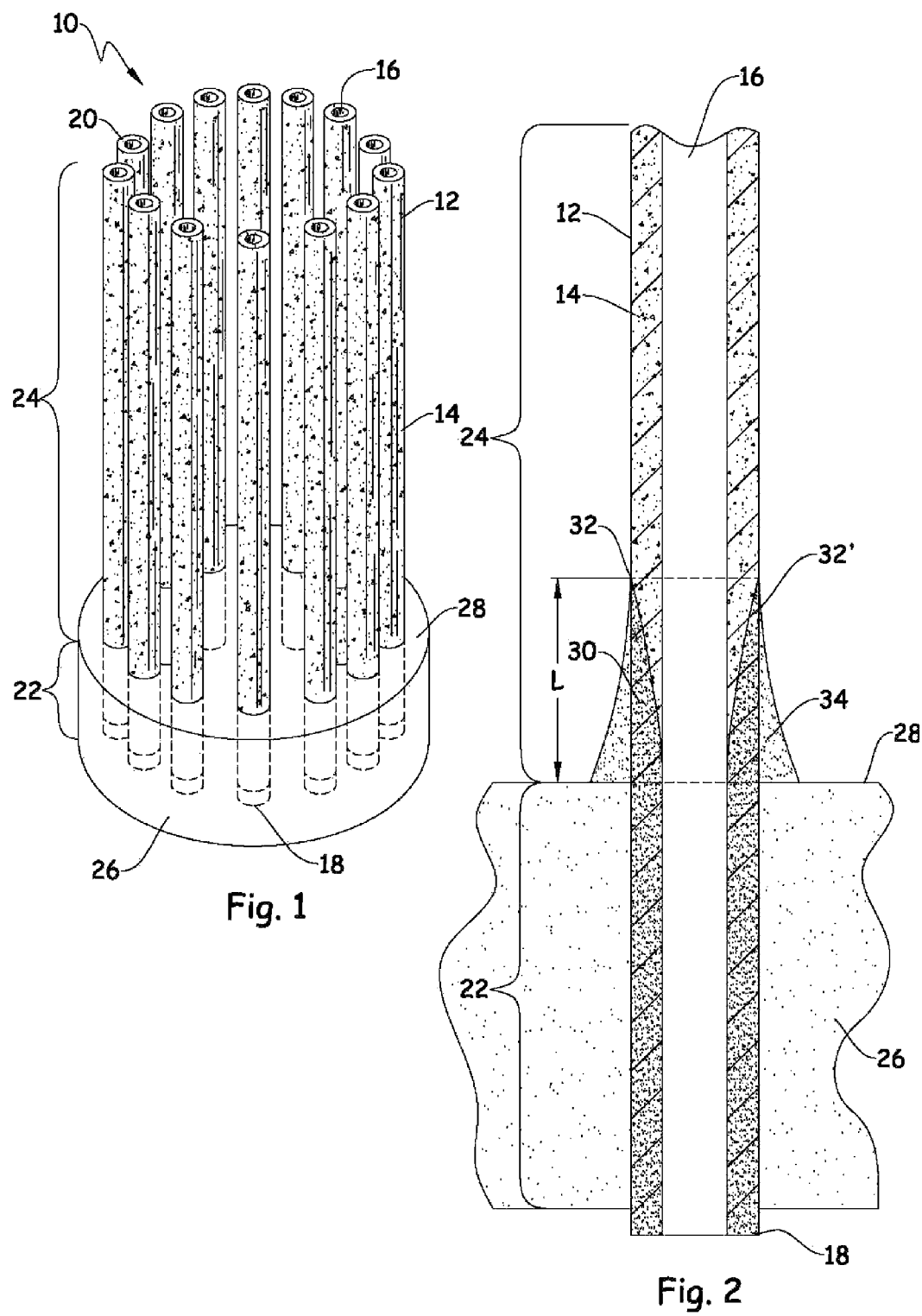

TUBESHEET AND METHOD FOR MAKING AND USING THE SAME

TECHNICAL FIELD

The present invention is directed toward tubesheets, modules incorporating tubesheets and methods for making and using the same.

BACKGROUND ART

Tubesheets are a component of many types of fluid filtration modules including those used in both gas and liquid separations. A tubesheet comprises a plurality of aligned semi-permeable hollow fiber membranes (i.e. "bundle") including end segments that are embedded (i.e. "potted") within a block of resinous potting material. The ends of the fibers may terminate within the potting material or extend therethrough to expose open lumens of the fibers. When fabricated into a module, the tubesheet provides a seal about the periphery of individual fibers and prevents fluid passage except via the lumens of the fibers. Depending upon the configuration of the module, the tubesheet may form a seal with the inner walls of a housing (e.g. U.S. Pat. No. 5,192,478) or a submergible header (e.g. US 2009/0026140; US 2005/0126982; U.S. Pat. No. 6,214,226; U.S. Pat. No. 6,294,039 and U.S. Pat. No. 7,160,454). Examples of tubesheets, methods for making tubesheets and modules incorporating tubesheets are provided in: U.S. Pat. No. 3,722,695; U.S. Pat. No. 4,138,460; U.S. Pat. No. 5,192,478; U.S. Pat. No. 6,290,756; U.S. Pat. No. 7,662,333 and JP 2009-125642. Specific potting techniques include centrifugal potting (e.g. U.S. Pat. No. 6,974,554) and the use of a mold structure with perforated plates (e.g. US 2007/0158257; U.S. Pat. No. 5,840,230 and JP 07-32867).

Fibers of tubesheets are susceptible to damage at or near the interface of the potting material. This is at least partially due to a lack of flexibility of the fiber near the interface with the potting material. Various techniques for ameliorating this effect are described in the literature including the use of multilayer potting layers (e.g. U.S. Pat. No. 3,708,071; U.S. Pat. No. 6,290,756; U.S. Pat. No. 6,974,554 and US 2007/0158257), adhesive layers (e.g. U.S. Pat. No. 6,592,759) and the use of fiber coatings near the potting interface (e.g. U.S. Pat. No. 5,192,478; U.S. Pat. No. 7,344,645; U.S. Pat. No. 7,704,393 and JP 2005-52716). These techniques address the outer periphery of the fiber and often require the use of multiple compositions and or process steps, e.g. potting with an inner layer of rigid epoxy potting material and an outer layer of a more flexible epoxy, silicone or polyurethane material.

STATEMENT OF INVENTION

In a main embodiment the invention includes a tubesheet comprising: i) a plurality of aligned semi-permeable hollow fiber membranes each comprising a cylindrical porous structure surrounding a lumen and extending between a first and second end and further comprising a first segment located adjacent the first end and a second segment located adjacent to the second end and ii) a block of potting material including an interfacial surface. The first segment of the hollow fiber membrane is embedded within the block of potting material and the second segment extends from the interfacial surface of the block. The tubesheet further comprises a penetrating extension of potting material within the porous structure of the second segment of the hollow fiber membrane that extends along a length from the interfacial surface of the block to a distal end. In preferred embodiments, the penetrating extension provides strain relief to the fiber near the interfacial surface of the block of potting material. Many additional embodiments are disclosed including modules incorporating tubesheets and methods for making and using the same.

BRIEF DESCRIPTION OF THE FIGURES

The included Figures illustrate several embodiments of the subject tubesheet. The Figures are not to scale and include idealized views to facilitate description. Where possible, like numerals have been used throughout the Figures and written description to designate the same or similar features.

FIG. 1 is a perspective view of a tubesheet.

FIG. 2 is a cross-sectional, partially cut-away elevational view of a tubesheet.

DETAILED DESCRIPTION

Figures 3A, 3B:
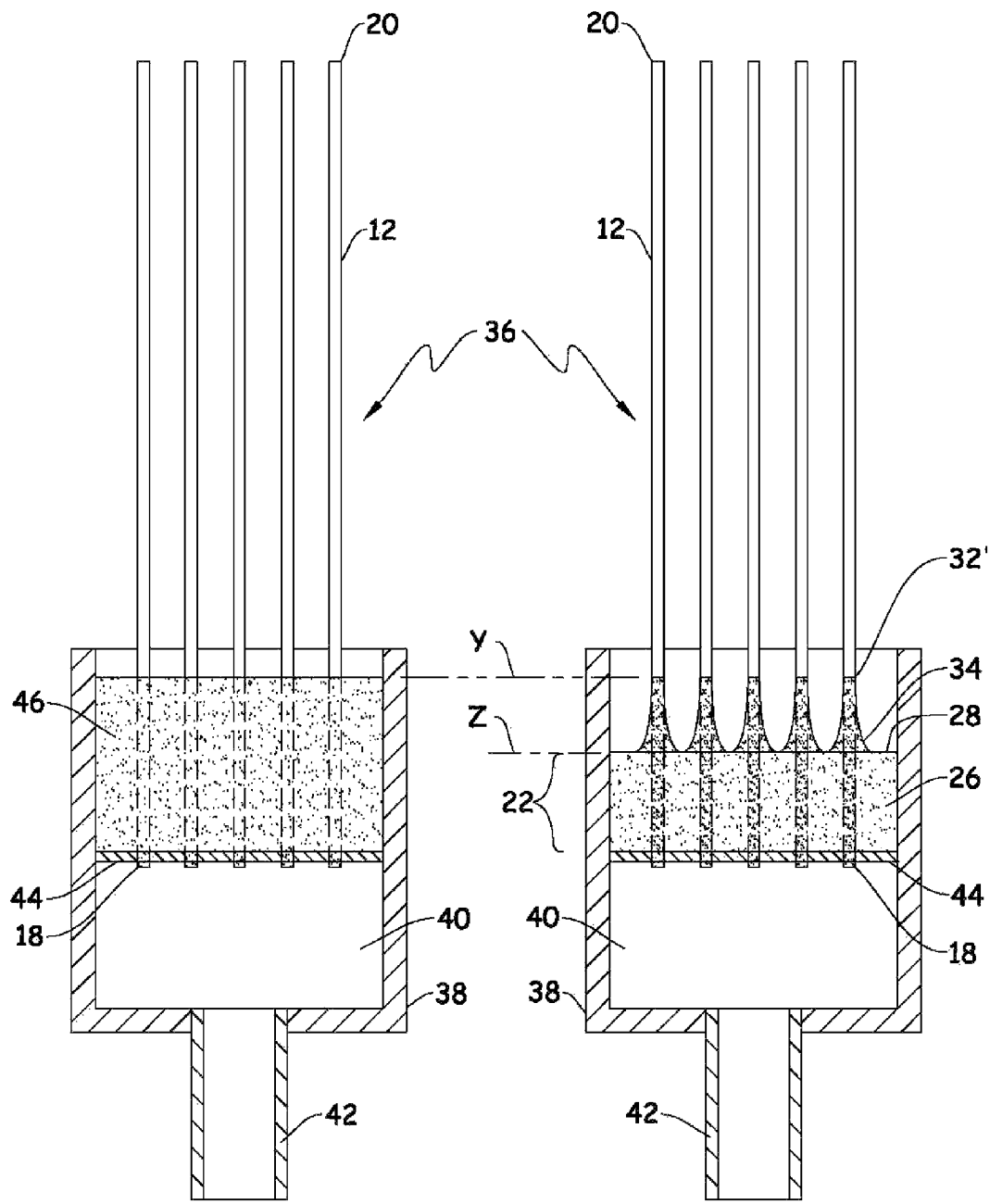
FIGS. 3(a) and 3(b) are cross-sectional elevational views of a submergible-type fluid filtration module showing a tubesheet at different stages of assembly.

A tubesheet is generally shown at 10 in FIG. 1. The tubesheet (10) comprises a plurality of semi-permeable hollow fiber membranes (12) each comprising a cylindrical porous structure (14) surrounding a lumen (16) and extending between a first (18) and second (20) end and further comprising a first segment (22) located adjacent the first end (18) and a second segment (24) located adjacent to the second end (20). While the semi-permeable hollow fiber membranes (i.e. "fibers") may be flexible and follow a non-linear path, they are preferably generally aligned along in a common path. This arrangement of fibers is commonly referred to in the art as a "bundle." The dimension of the fibers is not particularly limited. Preferred dimensions include: an outer diameter of from about 0.5 to 5 mm, an inner diameter of from about 0.5 to 2 mm and a wall thickness (i.e. porous structure between the inner and outer diameters) of from about 0.1 to 2 mm. The length of the fibers is not particularly limited and is typically dependant upon the design of the module in which the fibers are used with. Representative lengths include those from about 0.2 to 2 m. The type of semi-permeable hollow fiber membrane is not particularly limited. Representative examples include hollow fiber membranes prepared from polysulfones, polyether sulfones, polyvinylidene fluorides (PVDF) and polyamides, commonly prepared by way of known phase inversion processes. Additional examples include membranes made from polyolefins such as polypropylene, polyethylene and related copolymers via known etching and stretching processes. The cylindrical porous structure (14) of the fibers (12) is not particularly limited and may include isotropic or anisotropic structures. In preferred embodiments, the fibers (12) are suitable for micro and ultra-filtration applications, e.g. pore sizes of from about 0.001 to 10 µm but more preferably from 0.01 to 1 µm.

The tubesheet (10) further comprises a block (26) of potting material. The first segments (22) of the fibers (12) are embedded within the block (26) with the second segments (24) extended from the block (26). The transition between the first and second segments occurs at an interfacial surface (28) of the block (26). The configuration of the block (26) is not particularly limited and typically corresponds to a mold or module in which the block is formed, (as shown in FIGS. 3 and 4). The composition of the block (26) is not particularly limited but preferably comprises one or more of known potting materials including epoxy resins, polyurethanes and silicones.

FIG. 2 illustrates an enlarged cross-sectional view of a tubesheet such as that described with reference to FIG. 1. As shown, a first segment (22) of a fiber (12) is embedded within a block (26) of potting material with a second segment (24) extending from an interfacial surface (28) of the block (26). The interfacial surface (28) defines an outer periphery of the block (26) from which the fiber (12) extends. The tubesheet further comprises a penetrating extension (30) of potting material within the porous structure (14) of the second segment (24) of the fiber (12) that extends along a length (L) of the fiber (12) from the interfacial surface (28) of the block (26) to a distal end (32). The length (L) of the penetrating extension is preferably at least 3, more preferably at least 4 and even more preferably at least 5 times greater than the outer diameter of the fiber (12). In various embodiments, the length (L) is equal to or greater than 5, 6, 7, 8, 9 or 10 mm. In other embodiments, the length (L) is from about 2 to 30 mm, 6 to 30 mm, 7 to 20 mm, 10 to 20 mm, 7 to 15 mm, 8 to 15 mm, 9 to 15 mm and 10 to 15 mm. As shown, potting material may be present within the porous structure (14) of the fiber (12) at locations within the block (26), i.e. along the first segment (22) of the fiber (12).

The penetrating extension (30) preferably has a thickness at the interfacial surface (28) that is greater than the thickness at the distal end (32), wherein "thickness" is measured within the wall of the fiber (12), i.e. between the inner and outer diameters of the fiber. In one embodiment, the thickness of the penetrating extension (30) is greater at the interfacial surface (28) than at a mid-point along its length (L). In another embodiment, the thickness of the penetrating extension (30) decreases monotonically along the length (L) from the interfacial surface (28) to the distal end (32). The thickness of the penetrating extension may vary continuously along the length (L), i.e. have a "tapered" structure as shown in FIG. 2. Alternatively, the thickness may vary in a discontinuous manner, e.g. stair-step manner, not shown. In either embodiment, the thickness of the penetrating extension (30) at the interfacial surface (28) is preferably at least one half ($\frac{1}{2}$), but more preferably at least two thirds ($\frac{2}{3}$) of the wall thickness of the fiber (12). As shown in FIG. 2, the thickness of the penetrating extension (30) is substantially equal to the entire wall thickness of the fiber (12) at the interfacial surface (28) and monotonically decreases to the distal end (32) where the thickness is zero. In preferred embodiments the penetrating extension (30) provides strain relief to the fiber (12) at locations near the interfacial surface (28) of the block (26).

The tubesheet may include a coating layer (34) of potting material located upon the cylindrical porous surface (14) of the second segment (24) of the fiber (12) that extends along a length from the interfacial surface (28) of the block (26) to a remote end (32'). The length of the coating layer (34) need not be the same as length (L) of the penetrating extension (30). In one embodiment, the coating layer (34) has a thickness at the interfacial surface (28) that is greater than the thickness at the remote end (32'), wherein the thickness of the coating layer (34) is measured from the outer diameter of the fiber (12) outward, i.e. the thickness of the coating layer (34) does not include any potting material within the porous wall of the fiber. As with the thickness of the penetrating extension (30), the thickness of the coating layer (34) preferably decreases along its length from the interfacial surface (28) to the remote end (32'). The thickness may vary continuously along the length, i.e. have a "tapered" structure as shown in FIG. 2. Alternatively, the thickness may vary in a discontinuous manner, e.g. stair-step manner (not shown). As with the penetrating extension (30), the coating layer (34) may also provide strain relief to the fiber (12) at locations near the interfacial surface (28) of the block (26). Strain relief may be further enhanced by using a coating layer (34) having a thickness that decreases along its length from the interfacial surface (28) to the distal end (32').

Figure 4:
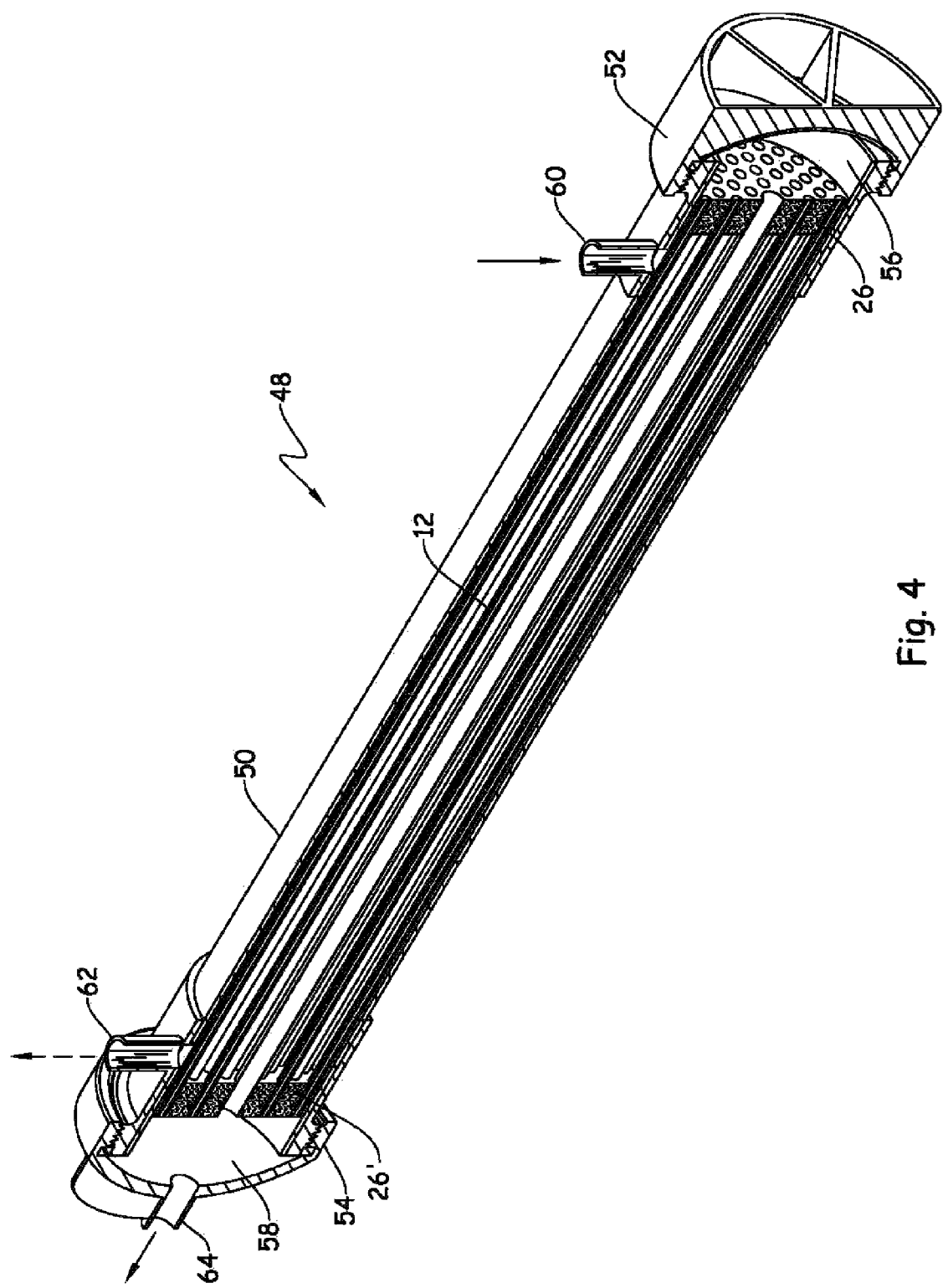
FIG. 4 is cross-sectional perspective view of a pressurized-type fluid filtration module.

FIGS. 3(a) and (b) illustrate a submergible-type module including a tubesheet at two different states of assembly. The module is generally shown at (36) including a rectangular header (38), permeate chamber (40) and permeate outlet (42). The module (36) includes a tubesheet as previously described, including a plurality of fibers (12) extending from a first end (18) to a second end (20). In the illustrated embodiment, the second ends (20) of the fibers (12) may be sealed but remain un-potted. The first ends (18) extend through a block (26) of potting material and are open. During assembly, fibers (12) are inserted through small holes in a plate (44). The holes of the plate (not shown) are of a size and shape which corresponds to the outer diameter of the fibers (12). The plate (44) serves to align and orientate the fibers (12) and provides a barrier to passage of liquid potting material during the potting process. The plate (44) may be an integral structure within the header (38) or a separate component that is subsequently positioned within the header (38) (before or after fibers (12) have been through the plate). Once the fibers (12) are positioned through the plate (44) and the plate is located within the header (38), liquid potting material (46) is dispensed into the header (38) to first level (Y). This stage of assembly is illustrated in FIG. 3(a). As shown in FIG. 3(b), a portion of liquid potting material is subsequently drained or otherwise removed so that the remaining potting material settles at a second level (Z) where it subsequently hardens to form a solid block (26). The block (26) of potting material provides a seal about the periphery of the individual fibers (12) and further seals the permeate chamber (40) within the header (38). The duration of time between the initial addition of liquid potting material to the first level (Y) and the removal of a portion of liquid potting material to the second level (Z) is not particularly limited but is preferably optimized based upon the pore size of the fibers (12), initial viscosity of the liquid potting material and the rate of cure of the potting material such that a penetrating extension is created as previously described. In preferred embodiments, the duration of time of exposure of fibers to liquid potting material at the first level (Y) is less than a few minutes, preferably less than 60 seconds, and more preferably less than 10 seconds and even more preferably less than 2 seconds.

In an alternative embodiment not shown, the tubesheet may made with a mold from which the tubesheet is subsequently removed. In yet another embodiment, the first segments of a bundle of fibers are submerged (e.g. dipped) to a first depth within liquid potting material within a mold or header and then partially retracted to a second depth (i.e. moved between a first position to a second position) where the potting material hardens to form a block. In this way, a penetrating extension is formed within a portion of the second segment of the fibers. A coating layer may optionally be formed upon the outer walls of the fibers.

In a preferred embodiment, the block, penetrating extension and optional coating layer (if present) comprise the same composition of potting material. Moreover, the block, penetrating extension and optional coating layer are preferably cured or hardened at substantially the same time, e.g. as part of a continuous potting operation wherein each component is formed.

FIG. 4 illustrates a pressurized-type fluid filtration module generally shown at (48) including a cylindrical housing (50), end caps (52, 54) including permeate chambers (56, 58) and fluid ports (60, 62, 64). A tubesheet is located within the housing (50) and includes a plurality of aligned of semi-permeable hollow fiber membranes (12) with a block (26, 26') of potting material located at each end. The configuration of the block (26) corresponds to the inner periphery of the housing (50) and creates a fluid seal therewith. In operation, pressurized feed fluid flows into the module via fluid port 60 and optionally exits via port (62), e.g. during cross-flow operation. A portion of the feed fluid flowing through the module (48) permeates through the fibers (12) and flows via the fiber lumens to permeate chambers (56, 58). Permeate exits the module at fluid port (64). The blocks (26, 26') of potting material prevent feed fluid from entering the permeate chambers (56, 58).

Many embodiments of the invention have been described and in some instances certain embodiments, selections, ranges, constituents, or other features have been characterized as being "preferred." Characterizations of "preferred" features should in no way be interpreted as designated such features as being required, essential or critical to the invention. It will be understood that certain features and sub-combinations are of utility and may be employed without reference to other features and sub-combinations. References to ranges of numerical values expressly include the end points of such ranges. The entire subject matter of each US patent document mentioned herein is incorporated by reference.

The invention claimed is:

1. A tubesheet comprising:
   i) a plurality of aligned semi-permeable hollow fiber membranes each comprising a cylindrical porous structure surrounding a lumen and defining an outer diameter, an inner diameter and a wall thickness therebetween, and extending between a first and second end and further comprising a first segment located adjacent the first end and a second segment located adjacent to the second end, and
   ii) a block of potting material including an interfacial surface,
   wherein the first segment of the hollow fiber membrane is embedded within the block of potting material and wherein the second segment extends from the interfacial surface of the block, and wherein the tubesheet is characterized by comprising a penetrating extension of potting material within the porous structure of the second segment of the hollow fiber membrane that extends along a length from the interfacial surface of the block to a distal end, and wherein the penetrating extension has a length equal to or greater than 8 mm and a thickness at the interfacial surface that is greater than the thickness at the distal end and that is at least two thirds the wall thickness of the hollow fiber membrane.

2. The tubesheet of claim 1 wherein the thickness of the penetrating extension decreases along the length from the interfacial surface to the distal end.

3. The tubesheet of claim 1 wherein the thickness of the penetrating extension decreases monotonically along the length from the interfacial surface to the distal end.

4. The tubesheet of claim 1 further comprising a coating layer of potting material located upon the cylindrical porous surface of the second segment of the hollow fiber membrane that extends along a length from the interfacial surface of the block to a remote end, and wherein the coating layer has a thickness at the interfacial surface that is greater than the thickness at the remote end.

5. The tubesheet of claim 1 wherein the block and the penetrating extension comprise the same composition potting material.

6. The tubesheet of claim 1 wherein the length of the penetrating extension of potting material is at least 5 times greater than the outer diameter of the hollow fiber membrane.

7. The tubesheet of claim 1 wherein the penetrating extension has a thickness at the interfacial surface that is greater than the thickness at a midpoint along its length.

8. A tubesheet comprising:
   i) a plurality of aligned semi-permeable hollow fiber membranes each comprising a cylindrical porous isotropic structure surrounding a lumen and defining an outer diameter, an inner diameter and a wall thickness therebetween, and extending between a first and second end and further comprising a first segment located adjacent the first end and a second segment located adjacent to the second end, and
   ii) a block of potting material including an interfacial surface,
   wherein the first segment of the hollow fiber membrane is embedded within the block of potting material and wherein the second segment extends from the interfacial surface of the block, and wherein the tubesheet is characterized by comprising a penetrating extension of potting material within the porous structure of the second segment of the hollow fiber membrane that extends along a length from the interfacial surface of the block to a distal end, and wherein the penetrating extension has a length equal to or greater than 8 mm and a thickness at the interfacial surface that is greater than the thickness at the distal end and that is at least two thirds the wall thickness of the hollow fiber membrane.

9. A tubesheet comprising:
   i) a plurality of aligned semi-permeable hollow fiber membranes each comprising a cylindrical porous structure surrounding a lumen and defining an outer diameter, an inner diameter and a wall thickness therebetween, and extending between a first and second end and further comprising a first segment located adjacent the first end and a second segment located adjacent to the second end, and
   ii) a block of potting material including an interfacial surface,
   wherein the first segment of the hollow fiber membrane is embedded within the block of potting material and wherein the second segment extends from the interfacial surface of the block, and wherein the tubesheet is characterized by comprising a penetrating extension of potting material within the porous structure of the second segment of the hollow fiber membrane that extends along a length from the interfacial surface of the block to a distal end, and wherein the penetrating extension has a length equal to or greater than 10 mm and a thickness at the interfacial surface that is greater than the thickness at the distal end and that is at least two thirds the wall thickness of the hollow fiber membrane.

\* \* \* \* \*